US011093591B1

(12) United States Patent
Gillis et al.

(10) Patent No.: US 11,093,591 B1
(45) Date of Patent: Aug. 17, 2021

(54) IDENTITY VERIFICATION

(71) Applicant: Wells Fargo Bank, N.A., San Francisco, CA (US)

(72) Inventors: Nicholas Gillis, West Des Moines, IA (US); Basil F. Nimry, Des Moines, IA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 677 days.

(21) Appl. No.: 15/901,133

(22) Filed: Feb. 21, 2018

(51) Int. Cl.
| | |
|---|---|
| *G06F 21/00* | (2013.01) |
| *G06F 21/31* | (2013.01) |
| *H04L 29/06* | (2006.01) |
| *G06F 21/45* | (2013.01) |
| *H04L 9/32* | (2006.01) |

(52) U.S. Cl.
CPC .............. *G06F 21/31* (2013.01); *G06F 21/45* (2013.01); *H04L 63/08* (2013.01); *H04L 9/3236* (2013.01)

(58) Field of Classification Search
None
See application file for complete search history.

(56) References Cited

U.S. PATENT DOCUMENTS

| | | | | |
|---|---|---|---|---|
| 2007/0140489 A1* | 6/2007 | Dharmarajan | ........ | H04L 9/0866 380/228 |
| 2007/0180260 A1* | 8/2007 | Crescenzo | .............. | G06F 21/31 713/183 |
| 2008/0235772 A1* | 9/2008 | Janzen | ................... | H04L 9/3236 726/5 |
| 2011/0078779 A1* | 3/2011 | Liu | ......................... | G06F 21/34 726/9 |
| 2013/0111570 A1* | 5/2013 | Kaariainen | ........... | H04L 63/126 726/5 |
| 2013/0283361 A1* | 10/2013 | Rao | ........................ | H04L 9/3236 726/7 |
| 2015/0172272 A1* | 6/2015 | Levner | ..................... | G06F 21/45 726/7 |
| 2016/0301682 A1* | 10/2016 | Roth | ...................... | H04L 63/083 |
| 2018/0034802 A1* | 2/2018 | Shelton | ................. | H04L 63/083 |

(Continued)

OTHER PUBLICATIONS

Dodis Y., Puniya P. (2008) Getting the Best Out of Existing Hash Functions; or What if We Are Stuck with SHA?. In: Bellovin S.M., Gennaro R., Keromytis A., Yung M. (eds) Applied Cryptography and Network Security. ACNS 2008. Lecture Notes in Computer Science, vol. 5037. Springer, Berlin, Heidelberg. (Year: 2008).*

(Continued)

*Primary Examiner* — Jeffery L Williams
(74) *Attorney, Agent, or Firm* — Merchant & Gould P.C.

(57) ABSTRACT

A method implemented on an electronic computing device for authenticating a user includes receiving authentication information from the user. The authentication information is processed to generate a transformed authentication value, such that the received authentication information is unrecognizable from the transformed authentication value. A reference authentication value is obtained. The reference authentication value is unrecognizable from the received authentication information. The transformed authentication value is compared with the reference authentication value. When the transformed authentication value matches the reference authentication value, the user is authenticated.

11 Claims, 6 Drawing Sheets

(56) References Cited

U.S. PATENT DOCUMENTS

2018/0270251 A1* 9/2018 Roth .................. H04L 63/0838

OTHER PUBLICATIONS

Kalinski, "PKCS#5: Password-Based Cryptogrpahy Specification V. 2.0", Network Working Group, RFC 2898, Sep. 2000, p. 1-34. (Year: 2000).*
Turan, et al. "Recommendation for Password-Based Key Derivation, Part 1: Storage Applications", NIST SP 800-132, NIST, Dec. 2010, p. 1-18. (Year: 2010).*
stackexchange.com, "Cascading hashes to increase computational difficulty", Aug. 24, 16, https://security.stackexchange.com/questions/134742/cascading-hashes-to-increase-computational-difficulty, accessed Dec. 31, 2020, p. 1-5. (Year: 2016).*

* cited by examiner

IDENTITY VERIFICATION

BACKGROUND

Personal information for many people is stored on a plurality of data store devices that can be accessed via the Internet. The personal information can include such items as dates of birth, social security numbers, driver license numbers, credit card numbers and other personal information.

Organizations that access and store the personal information typically implement security measures in an attempt to prevent unauthorized access of the personal information. However, in spite of the security measures, data breaches of the personal information do occur.

SUMMARY

Embodiments of the disclosure are directed to a method implemented on an electronic computing device for authenticating a user, the method comprising: receiving authentication information from the user; processing the authentication information to generate a transformed authentication value, such that the received authentication information is unrecognizable from the transformed authentication value; obtaining a reference authentication value, the reference authentication value being unrecognizable from the received authentication information; comparing the transformed authentication value with the reference authentication value; and when the transformed authentication value matches the reference authentication value, authenticating the user.

In another aspect, a method implemented on an electronic computing device for authenticating a user comprises: obtaining authentication information from the user; hashing the authentication information with a plurality of hash values from a hash value pool to generate a plurality of reference authentication values, each of the plurality of the reference authentication values being unrecognizable from the received authentication information; when the user is to be authenticated, receiving authentication information from the user; processing the authentication information to generate a transformed authentication value such that the authentication information is unrecognizable from the transformed authentication value; comparing the transformed authentication value with the plurality of reference authentication values; and when the transformed authentication value matches any of the plurality of reference authentication values, authenticate the user.

In yet another aspect, an electronic computing device comprises: a processing unit; and system memory, the system memory including instructions which, when executed by the processor, cause the electronic computing device to: receive authentication information from a user, the authentication information from the user comprising a social security number for the user, a date of birth of the user and a last name of the user; hash the social security number for the user with an initial hash value to obtain a first hash result; hash the date of birth of the user with the first hash result to obtain a second hash result; hash the last name of the user with the second hash result to obtain a third hash result; determine a number of entries in a hash value pool; hash a first hash value from the hash value pool with the third hash result to generate a preliminary authentication value; for each remaining entry in the hash value pool, hash a hash value corresponding to the remaining entry with a previous preliminary authentication value to generate an updated preliminary authentication value; when all entries in the hash value pool have been used, assign as a transformed authentication value a result of hashing a last updated preliminary authentication value with a last entry in the hash value pool, the transformed authentication value being unrecognizable from the authentication information; obtain a reference authentication value from a data store, the reference authentication value being previously obtained from a hash of the authentication information, the reference authentication value being unrecognizable from the received authentication information; compare the transformed authentication value with the reference authentication value; and when the transformed authentication value matches the reference authentication value, authenticate the user.

The details of one or more techniques are set forth in the accompanying drawings and the description below. Other features, objects, and advantages of these techniques will be apparent from the description, drawings, and claims.

DETAILED DESCRIPTION

Figure 1:
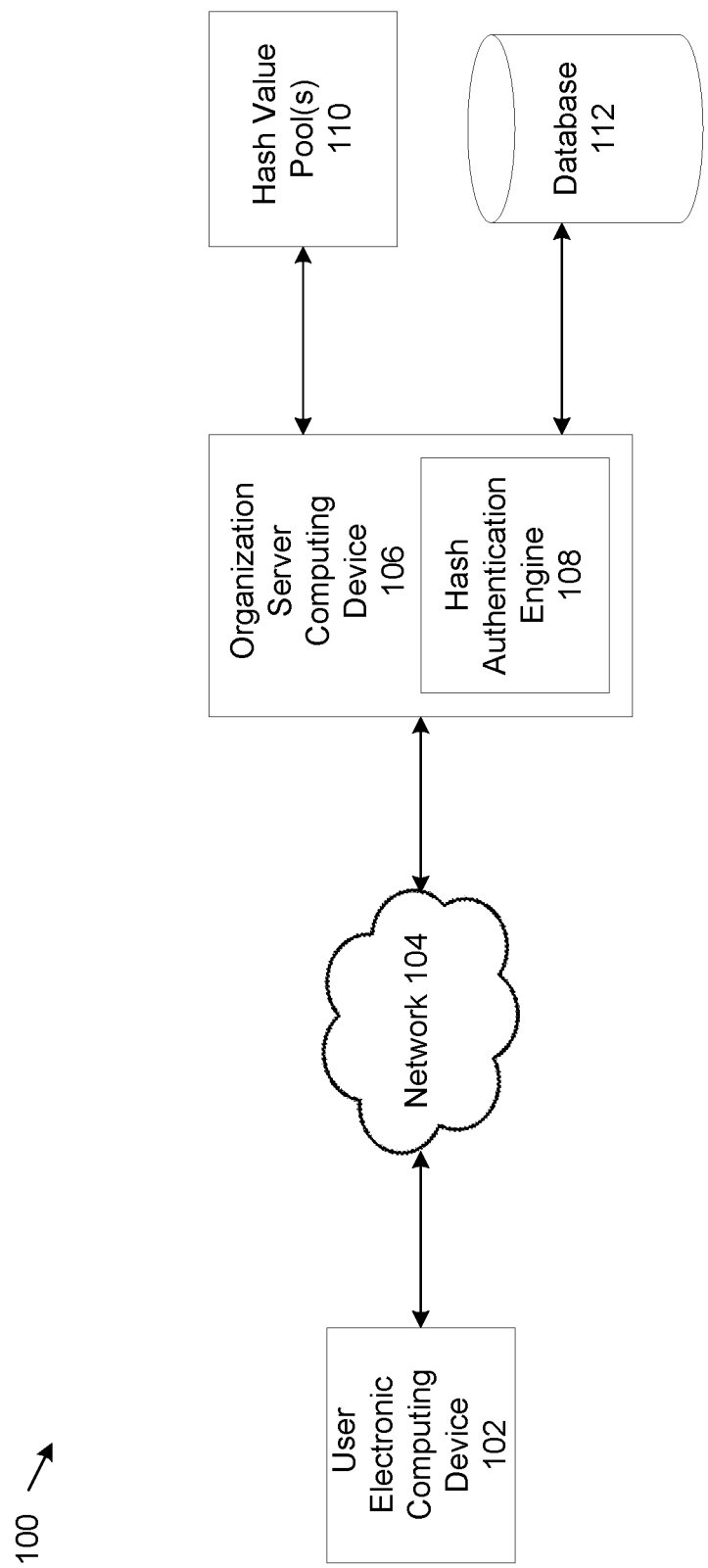
FIG. 1 shows an example system that supports a secure identity verification database.

The present disclosure is directed to systems and methods for identity verification. In some examples, the systems and methods include a secure identity verification database.

The secure identity verification database can store personal authentication information in a transformed manner such that the transformed personal authentication information is unrecognizable from the original personal authentication information. In addition, the transformed personal authentication information cannot be retransformed back into the original personal authentication information. If a data breach of the secure identify verification database does occur, any information obtained as a result of the data breach would be useless to anyone attempting to use the obtained information.

The stored personal authentication information can be used to authenticate a user who logs onto a computer system. In an example implementation, three items of personal authentication information are used—a social security number for the user, a date of birth of the user and the user's last name. In other implementations, other personal authentication information can be used, for example a street address of the user.

Using the systems and methods, the personal authentication information is hashed to transform the personal authentication information into a hashed value that can be used to authenticate the user. The hashed value is unrecognizable from any of the personal authentication information and would be meaningless to anyone who obtained the hashed value. The hashed value is compared against a reference authentication value and when a match occurs between the hashed value and the reference authentication value, the user is authenticated.

As discussed in more detail later herein, the reference authentication value is created by hashing the personal authentication information before the user attempts to log in to the computer system. The hashed value can be either a numeric value or an alphanumeric value. In this implementation, the hashed value is a numeric value and it is described as such during examples herein.

The systems and methods permit the personal authentication information to be stored in a secure area without necessarily a need to access the personal authentication information to authenticate the user. Instead, the transformed personal authentication information can be accessed to authenticate the user.

The systems and methods can permit multiple iterations of hashing to occur in order to produce more secure numerical and reference values. Hashing is performed using hash values from a hash value pool. After the reference authentication value is created, the hash values and the reference authentication value are stored. The hash values are obtained and used during the authentication process, so that the numerical value generated during the authentication process is based on the same hash values used to generate the reference authentication value.

The systems and method permit a plurality of hash value pools to be used. When hash values of one pool are used up, new hash values can be obtained from another hash value pool. In addition, the hash value pools can be stored in a distributed manner in one or more of a plurality of storage devices. The hash values used during a hash and a result of the hash can also be stored in a distributed manner in one or more of the plurality of storage devices. For example, the hash value pools, the hash values used during the authentication process and the numerical values generated as a result of the authentication process can be stored in a distributed database.

In addition, a plurality of hash values, numerical values and reference authentication values can be stored for each set of personal authentication information. For example, when the personal authentication information consists of the three items mentioned (social security number, birthdate and last name), there can be nine unique sequences of the three items. Therefore, nine separate reference authentication values can be generated, one for each unique sequence of the three items. As discussed in more detail later herein, the hashing mechanism is such that for each sequence of the items, a different result can be generated. In this implementation, storing nine separate reference authentication values ensures that when the user attempts to log in, a hashing of the user's personal authentication information will generate a numerical value that matches one of the nine reference authentication values regardless of the sequence in which the items of personal authentication information are received.

The systems and methods disclosed herein are directed to a computer technology that can authenticate a user to allow the user to login to a computer system in a secure manner without necessarily putting the personal authentication information of the user at risk. Instead, using the systems and methods, the personal authentication information of the user is transformed by hashing so that the personal authentication information becomes unrecognizable and worthless to anyone who attempts to hack the computer system.

Therefore, the systems and methods minimize the extent to which the personal authentication process would need to be secured during a login process because the personal authentication information is not required during the login process. Any comparisons done during login authentication are done with the transformed personal authentication information and not with the actual personal authentication information. The personal authentication information would not need to be stored and accessed during the login authentication process.

FIG. 1 shows an example system 100 that can support a secure identity verification database. System 100 includes a user electronic computing device 102, a network 104, an organization server computing device 106, one or more hash value pools 110 and a database 112. The organization server computing device 106 includes a hash authentication engine 108.

The example user electronic computing device 102 is an electronic computing device of user who attempts to login to organization server computing device 106 and be authenticated at organization server computing device 106. User electronic computing device 102 can be one or a desktop computer, laptop computer, smart phone or tablet computer.

The example network 104 is a computer network such as the Internet. User electronic computing device 102 can connect to and attempt to login to organization server computing device 106 using network 104.

The example organization server computing device 106 is a server computer of an organization to which the user wishes to login. In some implementations, organization server computing device 106 can be a web server. In other implementations, organization server computing device 106 can be server computer of an organization of which the user is an employee and to which the user has a need to access. Other examples of organization server computing device 106 are possible.

The example hash authentication engine 108 processes personal authentication information of the user and generates a hashed numerical value for the personal authentication information. The hashed numerical value is unrecognizable from the personal authentication information. Hash authentication engine 108 receives the personal authentication and generates the hashed numerical value when the user attempts to login to organization server computing device 106. Hash authentication engine 108 compares the hashed numerical value with a reference authentication value to determine whether to authenticate the user. The reference authentication value is generated by hash authentication engine 108 from the personal authentication information at an earlier point in time. Hash authentication engine 108 can store the reference authentication value, the hashed numerical value and hash reference information in database 112. Hash authentication engine 108 is described in more detail later herein.

The example hash value pool(s) 110 comprise one or more storage areas for hash values that can be used by hash authentication engine 108 during generation of the hashed numerical value and the reference authentication value. Hash value pool(s) 110 are described in more detail later herein.

The example database 112 is an electronic database associated with organization server computing device 106. Database 112 can store personal information regarding employees or customers of the organization associated with organization server computing device 106. The personal information can include the personal authentication information that can be used to authenticate the employee or the customer when the employee attempts to login to organization server computing device 106. Database 112 can also store login information for the employee and customer including reference authentication values, hashed numerical values and other hash data used during the login process.

Organization server computing device 106 can be programmed to query (e.g. using SQL) database 112 to obtain data relating to the login process, as discussed in more detail later herein. Database 112 can comprise one or more physical databases. Personal authentication information and other login data for employees and customers can be distributed and stored on a plurality of physical databases. The physical databases can be located in a plurality of geographical areas.

An example schema of information stored in database 112 is shown below:

User 1 ID value;
User 1 reference authentication data pointer;
User 1 reference authentication value 1;
User 1 reference authentication value 2;
. . . .
User 1 reference authentication value n;
User 1 initial hash value;
User 1 hash value pool pointer;
User 1 hash value pool index;
User 1 hash value pool number of iterations;
User 2 ID value;
User 2 reference authentication data pointer;
User 2 reference authentication value 1;
User 2 reference authentication value 2;
. . . .
User 2 reference authentication value n;
User 2 initial hash value;
User 2 hash value pool pointer;
User 2 hash value pool index;
User 2 hash value pool number of iterations;
. . . .
User m ID value;
User m reference authentication data pointer;
User m reference authentication value 1;
User m reference authentication value 2;
. . . .
User m reference authentication value n;
User m initial hash value;
User m hash value pool pointer;
User m hash value pool index;
User m hash value pool number of iterations;

The above schema permits database 112 to be queried for data needed to hash personal authentication information into an operational authentication value. This query can occur, for example, when a user attempts to login to organization server computing device 106 and provides a user ID. An example functional name for this query can be authentication initialization.

The user ID can be an account ID, for example a numeric or alphanumeric number identifying an account that the user has at the organization. In some implementations, the user ID can be a login ID or other identifier. In some implementations, the user ID can be hashed to provide an additional level of security. For example, the user ID can be hashed using fixed values so that the user ID will be hashed to the same hashed value every time the user logs in. The user ID or the hashed user ID can be stored in database 112. When the user attempts to login to organization server computing device 106, the user ID or the hashed user ID can be used to locate the reference authentication values stored for the user in database 112.

For example, the following messaging format can be used between organization server computing device 106 and database 112 to obtain the requested data.

| User ID | Authentication Initialization Request |
|---------|---------------------------------------|

Database 112 can use the following messaging format in responding to such a request. The data can include a pointer to a hash value pool, an initial hash value, a hash value pool index and a number of hash value iterations.

| User ID | Authentication Initialization Response | Hash Value Pool Pointer | Initial Hash Value | Hash Value Pool Index | Number of Hash Value Iterations |
|---------|----------------------------------------|-------------------------|--------------------|-----------------------|--------------------------------|

The above schema also permits database 112 to be queried to obtain reference authentication values corresponding to the user ID. Hash authentication engine 108 can then determine whether the operational authentication value matches any one of the reference authentication values.

For example, the following messaging format can be used between organization server computing device 106 and database 112 to obtain the requested data.

| User ID | Authentication Reference Value Request |
|---------|----------------------------------------|

Database 112 can use the following messaging format in responding to such a request. The response can include all reference authentication values stored for the user ID.

| User ID | Authentication Reference Value Request | Reference Authentication Value 1 | . . . | Reference Authentication Value n |
|---------|----------------------------------------|----------------------------------|-------|----------------------------------|

Similar message formats can be used for other fields.

Figure 2:
FIG. 2 shows example modules of the hash authentication engine of FIG. 1.

FIG. 2 shows example modules of hash authentication engine 108. Hash authentication engine 108 includes hash computation module 202, hash pool management module 204, hash iteration module 206 and hash data storage module 208. More, fewer or different modules can be used.

The example hash computation module 202 uses personal authentication information received from a user to generate a hashed value corresponding to the personal authentication information. The hashed value can be a numeric value or an alphanumeric value. The hashed value can be designated as a reference authentication value when the personal authentication information is initially received. As mentioned earlier, and as described in more detail later herein, a plurality of reference authentication values can be generated, one reference authentication value for every unique sequence of the personal authentication information. In addition, the hash value can be designated as operational authentication value when the user attempts to login to organization server computing device 106 and an attempt is made to authenticate the user. When the hash computation module 202 determines that the operational authentication value matches any one of the reference authentication values, the user is authenticated. A process used to calculate the operational and reference authentication values and to authenticate the user is described in more detail later herein.

The example hash pool management module 204 manages one or more hash pools that are used in the authentication process used to calculate the operational and reference authentication values. Each hash pool provides a plurality of hash numbers can that be added to other hash numbers during the authentication process. In addition, a plurality of hash pools can be used to provide more unique hash numbers and to permit a more extensive iteration of hash numbers during the authentication process.

The example hash iteration module 206 controls an extent to which rehashing of the operational and reference authentication values occurs. Each rehashing corresponds to an iteration. The more iterations, the more times the operational and reference authentication values are rehashed. Each rehashing adds a level of complexity to the operational and reference authentication values and thereby provides more security for the operational and reference authentication values.

The example hash data storage module 208 stores the reference authentication values and a hash values from the hash value pools used to generate the reference authentication values. When the user attempts to login, hash computation module obtains the hash values and uses the hash values along with received personal authentication information from the user to generate the operational authentication value. Because the same hash values are used to generate both the operational authentication value and the reference authentication value, when the received personal authentication information is the same as that used to calculate the reference authentication values, the operational authentication value should match one of the reference authentication values. A hash value pool pointer can permit access to a current hash value pool being used. A hash value pool index can indicate a next location in the current hash value pool being used.

Figure 3:
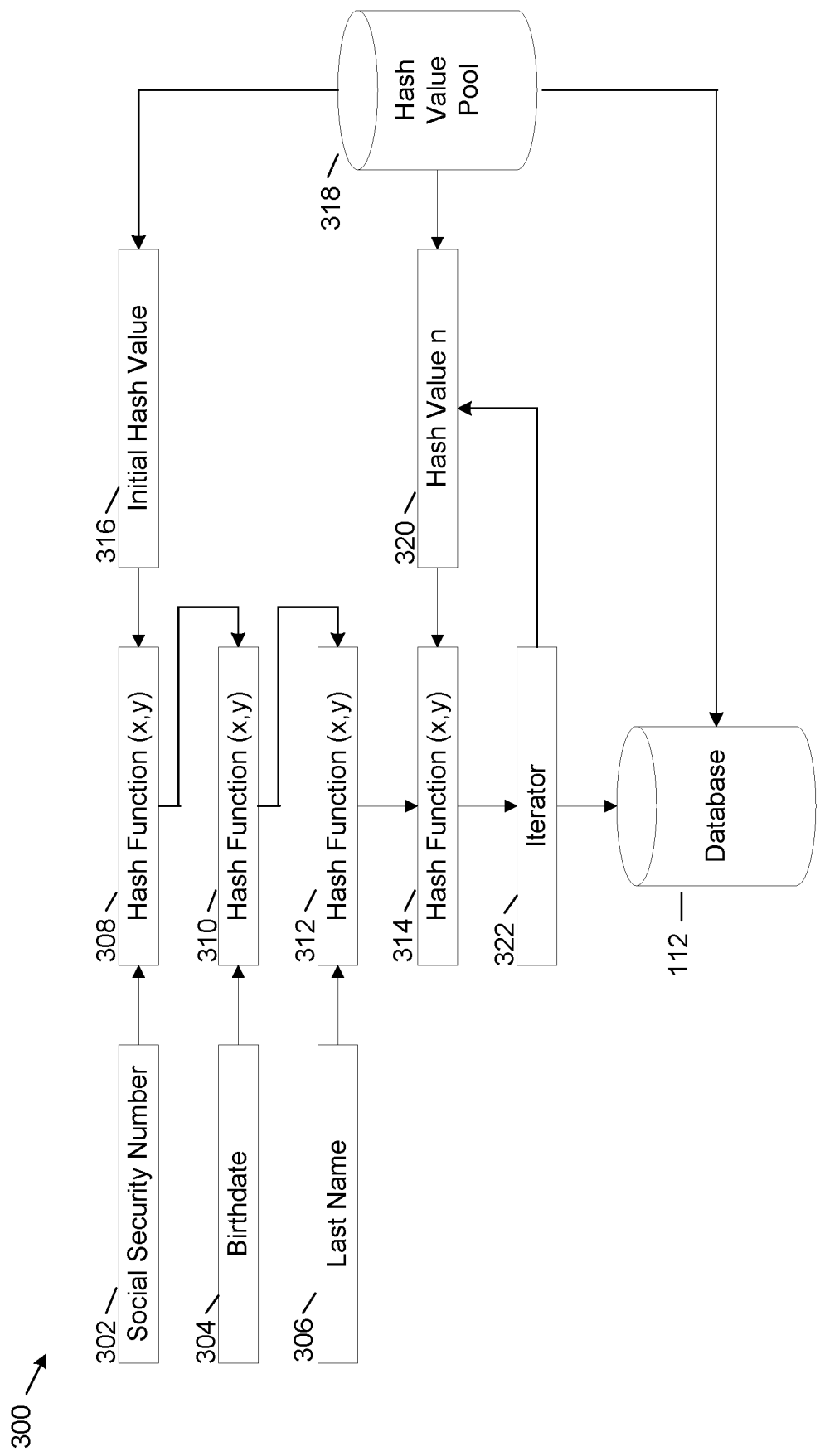
FIG. 3 shows an example schematic diagram of a process used to authentication reference values.

FIG. 3 shows an example schematic diagram of a process 300 used to calculate the operational and reference authentication values. The example process 300 is described for generation of one of the reference authentication values.

Inputs to process 300 include a social security number 302, a birthdate 304 and a last name 306 for the user. The social security number 302, the birthdate 304 and the last name 306 comprise personal authentication information for the user. For other implementations, other personal authentication information can be used.

As discussed below, the social security number 302 is hashed first, followed by the birthdate 304 and the last name 306. This sequence of personal authentication information results in a generation of one reference authentication number. For this implementation, there also can be eight additional sequences of the personal authentication information. For example, social security number 302 can be hashed first, followed by last name 306 and birthdate 304 and birthdate 304 can be hashed first, followed by social security number 302 and last name 306. For each of these sequences a unique reference authentication number can be generated.

For process 300, the social security number 302 is applied to a hash function (x,y) 308. Hash function (x,y) 308 is a hash function that receives two inputs and generates a hashed output. A second input for hash function (x,y) 308 is an initial hash value 316 from hash value pool 318.

Hash function (x,y) 308 performs a mathematical operation on the two inputs to produce the single output. Many different types of mathematical operations are possible, for example concatenating the two inputs, shifting bits for one or more of the inputs and performing one or more Boolean operations on one or more bits of the inputs. Other mathematical operations are possible. For process 300, the two inputs are simply concatenated. When the last name is one of the inputs, numerical values corresponding to each letter of the last name are used, corresponding to an alphabetic order of the letters. In other implementations, hash functions that produce hashed alphanumeric outputs can be used.

The hashed output of hash function (x,y) 308 is applied to hash function (x,y) 310. For process 300, the user's birthdate 304 is also applied to hash function (x,y) 310. For process 300, the operation of hash function (x,y) 310 is identical to the operation of hash function (x,y) 308, i.e. the two inputs to hash function (x,y) 310 are simply concatenated. In other implementations, hash function (x,y) 308 and hash function (x,y) 310 can have different operations.

The hashed output of hash function (x,y) 310 is applied to hash function (x,y) 312. For process 300, a numerical representation of the user's last name 306 is also applied to hash function (x,y) 312. For process 300, the operation of hash function (x,y) 312 is identical to the operation of hash function (x,y) 308 and hash function (x,y) 310.

The hashed output of hash function (x,y) 312 is applied to hash function (x,y) 314. Another hash value, hash value n 320 is also applied to hash function (x,y) 312. For a first iteration, hash value n 320 corresponds to a first hash value from hash value pool 318. For the first iteration, hash value n 320 can be identical to initial hash value 316. For process 312, the operation of hash function (x,y) 312 is identical to the operation of hash function (x,y) 308, hash function (x,y) 310, and hash function (x,y) 312.

Hash value pool 318 comprises a data store for a plurality of hash numbers. These hash numbers can be randomly generated and stored in hash value pool 318. Initial hash value 316 is a first entry in hash value pool 318. For process 300, the remaining hash numbers in hash value pool 318 can be used for additional iterations of hashing (rehashing), as explained in more detail later herein. In addition, hash value pool 318 can comprise a plurality of hash value pools. When all the hash numbers in one hash value pool 318 are used, another of the hash value pools can be used. In some implementations, a particular hash value pool 318 that is used is dependent on the personal authentication information being used. For example, for a social security number 302 that starts with 1, one hash value pool can be used and for a social security number 302 that starts with 4, a second hash value pool can be used.

The size of hash value pool 318 can vary. In some implementations, hash value pool 318 can have 500 entries. In other implementations, hash value pool 318 can have 5000 entries. Other sizes for hash value pool 318 are possible.

The output of hash function (x,y) 314 can comprise a reference authentication value using initial hash value 316 and a personal authentication information sequence of social security number 302, followed by birthdate 304, followed by last name 306. However, in process 300, multiple iterations are performed on the initial output of hash function (x,y) 314 before a final reference authentication value is obtained. Each of the multiple iterations comprises a rehashing of the hashed output of hash function (x,y) 314. For each of the multiple iterations, the hashed output of hash function (x,y) 314 is rehashed with a next hash value, corresponding to hash value n 320 from hash value pool 318. Iterator 322 is incremented for each rehashing.

After each iteration, a determination is made as to whether all hashed values from hash value pool 318 have been used. When all hashed values have been used, the last hashed output of hash function (x,y) 314 is designated as the reference authentication value for the personal authentication information sequence being used. In some implementations a predetermined number of iterations can be used. For example, the output of hash function (x,y) 314 can be hashed the predetermined number of iterations, for example 5 or 10 iterations, to generate the reference authentication value.

The reference authentication value and the pointer or identifier for hash value pool 318 are then stored in database 112. This information is then used during process 300 during an authentication for the user when the user attempts to login to organization server computing device 106. In addition, process 300 continues generating and saving reference authentication values for each of the eight remaining sequences of the received personal authentication information.

Process 300 is also used to generate an operational authentication value when the user attempts to login to organization server computing device 106. Using the personal authentication information in the sequence in which it is received, a preliminary operational authentication value is output from hash function (x,y) 314. This preliminary operational authentication value is then rehashed a number of times corresponding to the number of entries in hash value pool 318. The preliminary operational authentication value is generated using the same initial hash value 316 as used when generating the reference authentication values. The rehashing of the hashed output of hash function (x,y) 314 is performed using the same hash values as in hash value pool 318. Therefore, if the received personal authentication information is the same as that used to generate the reference authentication values, the operational authentication value that is output from hash function (x,y) 314 after the final iteration should match one of the nine reference authentication values associated with the personal authentication information that is stored in database 112.

In some implementations, after a user is authenticated, the personal authentication information can be rehashed and new reference authentication values can be generated. The new reference authentication values and the hash values from hash value pool 318 used to generate these reference authentication values can be stored in database 112 and associated with the personal authentication information. When all hash values in hash value pool 318 are used, other hash values can be obtained from another hash pool. In some implementations, rehashing and storing of the reference authentication numbers and hash values can also occur periodically, for example once per 24 hours.

Figure 4:
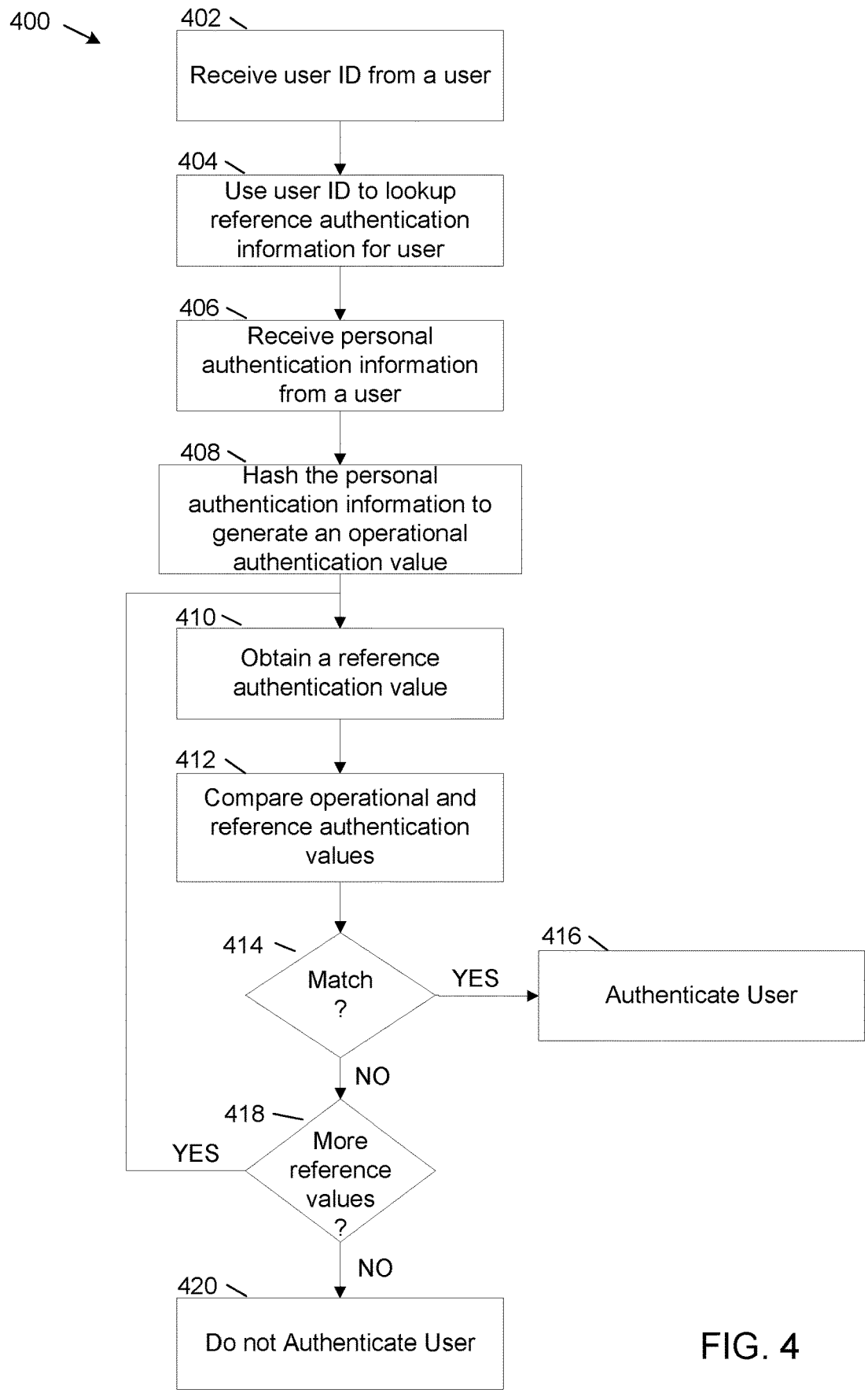
FIG. 4 shows an example method for authenticating a user.

FIG. 4 shows a flowchart for an example method 400 for authenticating a user who attempts to login to a computer system, for example to organization server computing device 106. Method 400 assumes that the user provides a user ID, for example an account ID and three items of personal authentication information—the user's social security number, birthdate and last name. Method 400 also assumes that the items of personal authentication information are received from the user in the order of social security number, birthdate and last name. Method 400 further assumes that a plurality of authentication reference numbers have already been generated based on the personal authentication information of the user, as discussed earlier herein.

At operation 402, the user ID is received from the user. For method 400, the user ID is an account ID for the user at the organization. For example, if the organization is a financial organization, the account ID can be a unique identifier for a financial account that the user has at the organization.

At operation 404, the user ID is used to lookup reference authentication information for the user. In some implementations, the reference authentication information can be located using a text value of the user ID. In other implementations, the user ID is hashed and the hashed value of the user ID is used to locate the reference authentication information. The reference authentication information comprises hashed values of previously entered user personal authentication information, as discussed earlier herein.

At operation 406, the personal authentication information (social security number, birthdate and last name) is received from the user. The personal authentication information can be received, for example, as a result of being prompted at user electronic computing device 102 for the personal authentication information when the user attempts to login to organization server computing device 106. The user can then supply the requested items of personal authentication information via user electronic computing device 102.

At operation 408, the personal authentication information is hashed to generate an operational authentication value. As discussed earlier herein with regard to FIG. 3, the personal authentication information is hashed by a hash function using an initial hash value and other hash values from a hash value pool. In addition, the result of a last hash can be rehashed a plurality of times to generate a final operational authentication value. The operational authentication value is so named because it is a hash value generated during an operation of authenticating a user who attempts to login to the computer system.

At operation 410, a reference authentication value is obtained from database 112. The reference authentication value is an authentication value previously generated from the personal authentication information and used as a reference value that can be compared with the operational authentication value. As discussed earlier herein, a plurality of reference authentication values can be generated from the personal authentication information and stored in database 112. In an example implementation, all reference authentication values associated with a given user ID can be obtained in a single SQL request to database 112.

At operation 412, the operational authentication value from operation 408 is compared against the reference authentication value from operation 410.

At operation 414, when the operational authentication value matches the reference authentication value, at operation 416, the user is authenticated.

At operation 414, when the operational authentication value does not match the reference authentication value, at operation 418, a determination is made as to whether there are any additional authentication reference values obtained for the user.

At operation 414, when a determination is made that there are more authentication reference values, control returns to operation 410 where another authentication value is obtained.

Operations 412, 414 and 418 are repeated until either the operational authentication value matches one of the reference authentication values, in which case the user is authenticated at operation 416 or a determination is made that operational authentication value does not match any of the reference authentication values. When the determination is made at operation 418 that all reference authentication values have been obtained and there still is not a match, at operation 420, the user is not authenticated and the login procedure ends.

Figure 5:
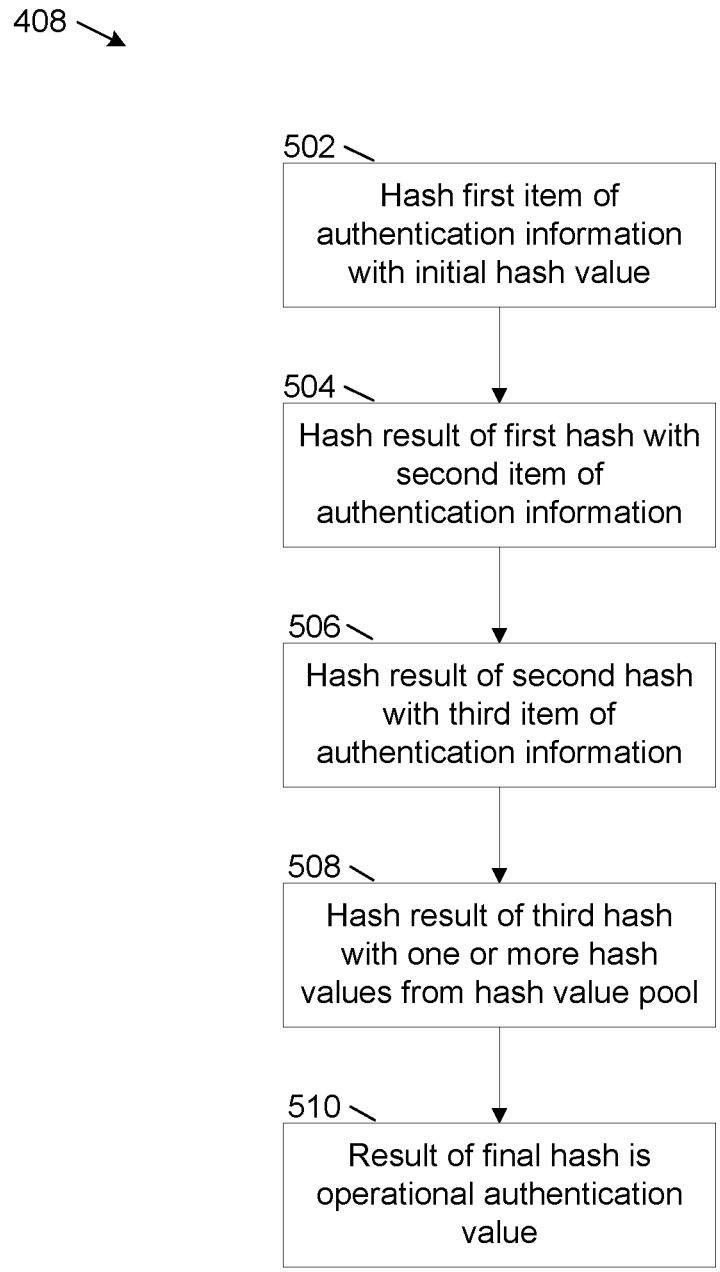
FIG. 5 shows additional details of the method of FIG. 4.

FIG. 5 shows a flowchart for operation 408 of method 400 regarding hashing the authentication information to generate an operational authentication value.

At operation 502, the first item of authentication information, in this case the user's social security number, is hashed with an initial hash value from a hash value pool.

At operation 504, a result of the hash operation in operation 502 is hashed with the second item of authentication information, in this case the user's birthdate.

At operation 506, a result of the hash operation in operation 504 is hashed with the third item of authentication information, in this case the user's last name.

At operation 508, a result of the hash operation in operation 506 is hashed with one or more hash values from the hash value pool to generate preliminary operational authentication values. The hashing of the result of the hash operation in operation 506 from the hash value pool comprises a rehashing of a preliminary operational authentication value. The number of times the preliminary operational authentication value is rehashed is dependent on a size of the hash value pool and on a parameter that specifies a number of iterations of hashing using the hash value pool. Each time a preliminary operational authentication value is rehashed, an updated preliminary authentication value is generated.

At operation 510, when the last rehashing is completed, the last result of the hashing at operation 508 is assigned as the operational authentication value to be compared against a reference authentication value.

Figure 6:
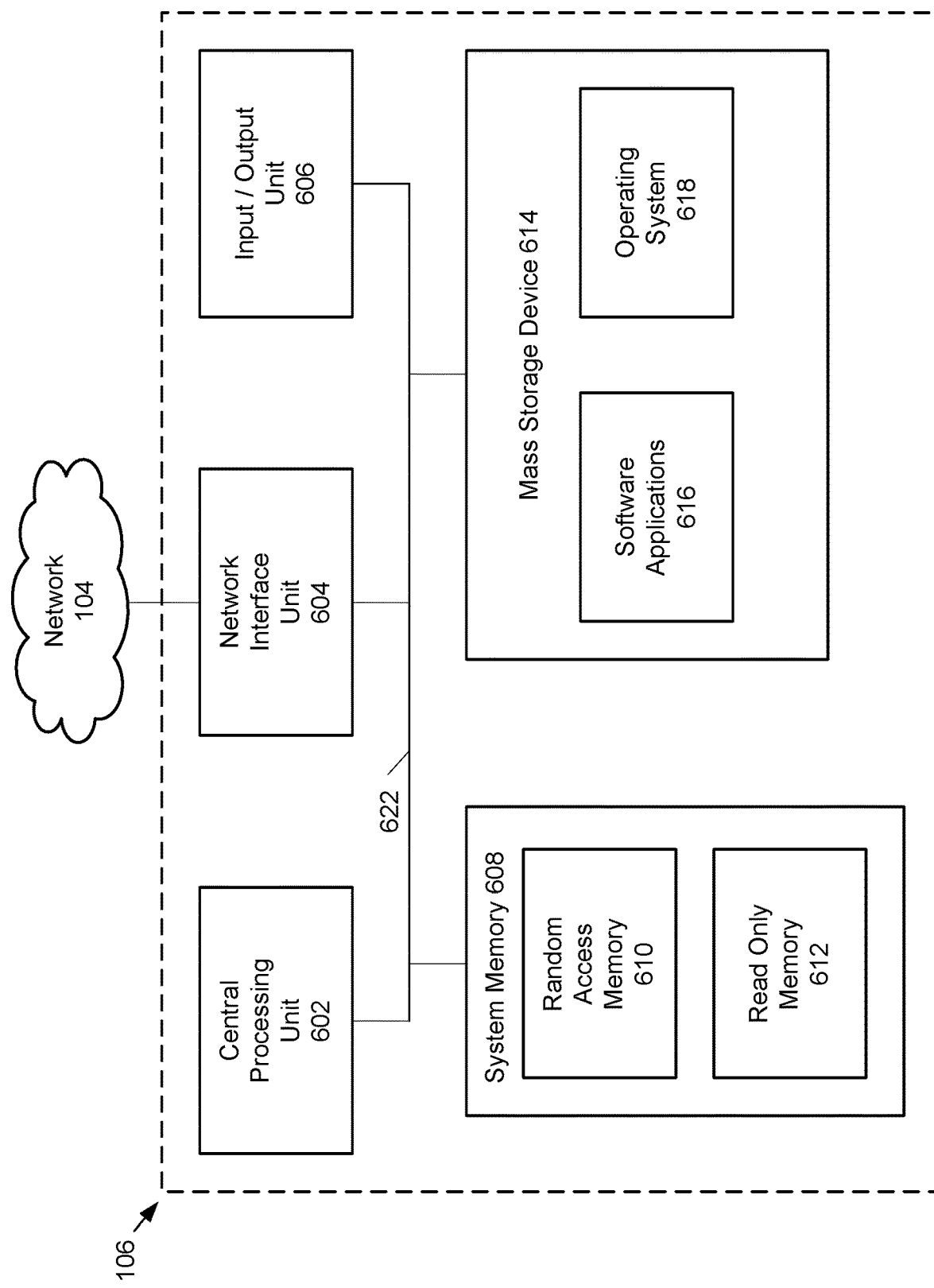
FIG. 6 shows example physical components of the organization server computing device of the system of FIG. 1.

As illustrated in the example of FIG. 6, organization server computing device 106 includes at least one central processing unit ("CPU") 602, also referred to as a processor, a system memory 608, and a system bus 622 that couples the system memory 608 to the CPU 602. The system memory 608 includes a random access memory ("RAM") 610 and a read-only memory ("ROM") 612. A basic input/output system that contains the basic routines that help to transfer information between elements within the organization server computing device 106, such as during startup, is stored in the ROM 612. The organization server computing device 106 further includes a mass storage device 614. The mass storage device 614 is able to store software instructions and data. Some or all of the components of the organization server computing device 106 can also be included in a plurality of server computing devices for the organization, as well as in user electronic computing device 102.

The mass storage device 614 is connected to the CPU 602 through a mass storage controller (not shown) connected to the system bus 622. The mass storage device 614 and its associated computer-readable data storage media provide non-volatile, non-transitory storage for the organization server computing device 106. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the organization server computing device 106.

According to various embodiments of the invention, the organization server computing device 106 may operate in a networked environment using logical connections to remote network devices through the network 104, such as a wireless network, the Internet, or another type of network. The organization server computing device 106 may connect to the network 104 through a network interface unit 604 connected to the system bus 622. It should be appreciated that the network interface unit 604 may also be utilized to connect to other types of networks and remote computing systems. The organization server computing device 106 also includes an input/output controller 606 for receiving and processing input from a number of other devices, including a touch user interface display screen, or another type of input device. Similarly, the input/output controller 606 may provide output to a touch user interface display screen or other type of output device.

As mentioned briefly above, the mass storage device 614 and the RAM 610 of the organization server computing device 106 can store software instructions and data. The software instructions include an operating system 618 suitable for controlling the operation of the organization server computing device 106. The mass storage device 614 and/or the RAM 610 also store software instructions and software applications 616, that when executed by the CPU 602, cause the organization server computing device 106 to provide the functionality of the organization server computing device 106 discussed in this document. For example, the mass storage device 614 and/or the RAM 610 can store software instructions that, when executed by the CPU 602, cause the organization server computing device 106 to display received data on the display screen of the organization server computing device 106.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A method implemented on an electronic computing device for authenticating a user, the method comprising:
   receiving authentication information from the user;
   processing the authentication information to generate a transformed authentication value, such that the authentication information is unrecognizable from the transformed authentication value;
   obtaining a plurality of reference authentication values, the reference authentication values being unrecognizable from the authentication information, wherein the plurality of reference authentication values are associated with the authentication information from the user, with at least a portion of the plurality of reference authentication values being derived from a unique combination of items of the authentication information from the user;
   comparing the transformed authentication value with the plurality of reference authentication values; and
   when the transformed authentication value matches one of the plurality of reference authentication values, authenticating the user.

2. The method of claim 1, wherein generating the transformed authentication value comprises:
   hashing a first item of the authentication information with an initial hash value to obtain a first hash result;
   hashing a second item of the authentication information with the first hash result to obtain a second hash result;
   hashing a third item of the authentication information with the second hash result to obtain a third hash result; and using the third hash result and one more hash values from a hash random value pool to perform one or more additional hashes to generate the transformed authentication value.

3. The method of claim 2, wherein using the third hash result and the one or more values from the random value pool to generate the transformed authentication value comprises:
   determining a number of entries in the random value pool;
   hashing a first value from the random value pool with the third hash result to generate a preliminary authentication value;
   for each remaining entry in the random value pool, hashing a value corresponding to the remaining entry with a previous preliminary authentication value to generate an updated preliminary authentication value; and
   when all entries in the random value pool have been used, assign as the transformed authentication value a result of hashing a last updated preliminary authentication value with a last entry in the random value pool.

4. The method of claim 2, wherein the initial value is a value previously used to generate the plurality of reference authentication values.

5. The method of claim 2, wherein the initial value and the plurality of reference authentication values are stored in a distributed database.

6. The method of claim 2, wherein after the user is authenticated, further comprising rehashing the transformed authentication value, comprising:
   hashing the first item of the authentication information with a second value from the random value pool to obtain a fourth hash result;
   hashing the second item of the authentication information with the fourth hash result to obtain a fifth hash result;
   hashing the third item of the authentication information with the fifth hash result to obtain a sixth hash result;
   using the sixth hash result and the one more values from the random value pool to perform one or more additional hashes to generate a revised transformed authentication value; and
   using the revised transformed authentication value as the one of the reference authentication values for a future authentication of the user.

7. The method of claim 6, further comprising storing the second value and the revised transformed authentication value in the distributed database.

8. The method of claim 1, wherein the authentication information includes a social security number of the user, a birthdate of the user and a last name of the user.

9. The method of claim 8, wherein the social security number of the user, the birthdate of the user and the last name of the user can be received in any order.

10. The method of claim 1, wherein, when the transformed authentication value does not match the reference authentication value:
    comparing the transformed authentication value with each of the plurality of reference authentication values; and
    when the transformed authentication value matches any of the plurality of reference authentication values, authenticate the user.

11. The method of claim 1, wherein the reference authentication value is previously generated from the authentication information from the user and a value from a random value pool.

* * * * *

UNITED STATES PATENT AND TRADEMARK OFFICE
CERTIFICATE OF CORRECTION

| | | |
|---|---|---|
| PATENT NO. | : 11,093,591 B1 | Page 1 of 1 |
| APPLICATION NO. | : 15/901133 | |
| DATED | : August 17, 2021 | |
| INVENTOR(S) | : Gillis et al. | |

It is certified that error appears in the above-identified patent and that said Letters Patent is hereby corrected as shown below:

On the Title Page

Page 2, Column 1 Item (56) (Other Publications), Line 1: delete "Cryptogrpahy" and insert --Cryptography--

In the Claims

Column 12, Line 62, Claim 2: after "initial" delete "hash"

Column 13, Line 1, Claim 2: after "more" delete "hash"

Column 13, Line 2, Claim 2: after "a" delete "hash"

Column 14, Lines 24-25, Claim 10: after "with" delete "each of"

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*